(12) United States Patent
Lee et al.

(10) Patent No.: US 8,537,124 B2
(45) Date of Patent: Sep. 17, 2013

(54) TOUCH SENSOR, LIQUID CRYSTAL DISPLAY PANEL HAVING THE SAME AND DRIVING METHOD FOR THE SAME

(75) Inventors: Jae-Hoon Lee, Seoul (KR); Bong-Hyun You, Yongin-si (KR); Byoung-Jun Lee, Cheonan-si (KR); Jai-Hyun Koh, Anyang-si (KR)

(73) Assignee: Samsung Display Co., Ltd., Yongin (KR)

( * ) Notice: Subject to any disclaimer, the term of this patent is extended or adjusted under 35 U.S.C. 154(b) by 1185 days.

(21) Appl. No.: 12/366,186

(22) Filed: Feb. 5, 2009

(65) Prior Publication Data

US 2010/0039406 A1  Feb. 18, 2010

(30) Foreign Application Priority Data

May 22, 2008 (KR) .................. 10-2008-0047624

(51) Int. Cl.
*G06F 3/041* (2006.01)
*G06F 3/045* (2006.01)
*G06F 3/042* (2006.01)
*G06F 3/038* (2013.01)
*G09G 3/36* (2006.01)

(52) U.S. Cl.
USPC ........... 345/173; 345/174; 345/175; 345/207; 345/104; 178/18.09

(58) Field of Classification Search
USPC .................. 345/204–207, 690, 697, 4–5, 30, 345/55, 76, 81–84, 87, 93, 102, 104, 173–175; 178/18.09
See application file for complete search history.

(56) References Cited

U.S. PATENT DOCUMENTS

| | | | |
|---|---|---|---|
| 2005/0207172 A1 | 9/2005 | Orth | |
| 2006/0170658 A1 | 8/2006 | Nakamura | |
| 2007/0046593 A1* | 3/2007 | Shin | ............... 345/81 |
| 2007/0063957 A1* | 3/2007 | Awakura et al. | ............... 345/98 |
| 2007/0109286 A1* | 5/2007 | Nakamura et al. | ............ 345/204 |
| 2009/0020686 A1* | 1/2009 | Sano | ......................... 250/208.1 |

FOREIGN PATENT DOCUMENTS

| | | |
|---|---|---|
| CN | 1749819 | 3/2006 |
| CN | 1779631 | 5/2006 |
| CN | 101008729 | 8/2007 |
| JP | 09237158 | 9/1997 |
| JP | 2003131798 | 5/2003 |
| JP | 2006244446 | 9/2006 |
| JP | 2006-330578 | 12/2006 |
| JP | 2006-330649 | 12/2006 |
| JP | 2007-048275 | 2/2007 |
| JP | 2008-058925 | 3/2008 |
| KR | 1020060089166 | 8/2006 |
| KR | 10-2006-0128242 | 12/2006 |
| KR | 10-0659620 | 12/2006 |

* cited by examiner

*Primary Examiner* — Lun-Yi Lao
*Assistant Examiner* — Jarurat Suteerawongsa
(74) *Attorney, Agent, or Firm* — H.C. Park & Associates, PLC

(57) ABSTRACT

A touch sensor is installed inside a liquid crystal display panel to sense a touch operation and includes a light sensing part including a photodiode, a capacitance sensing part including a liquid crystal capacitor, and a sensing signal output part. The light sensing part generates a control signal corresponding to a variation in the amount of external light when the liquid crystal display panel is touched. The capacitance sensing part varies the control signal based on a variation in the capacitance of the liquid crystal capacitor when the liquid crystal display panel is touched. The sensing signal output part generates a sensing signal in response to the control signal and determines an output timing of the sensing signal.

38 Claims, 14 Drawing Sheets

TOUCH SENSOR, LIQUID CRYSTAL
DISPLAY PANEL HAVING THE SAME AND
DRIVING METHOD FOR THE SAME

CROSS-REFERENCE TO RELATED APPLICATION

This application claims priority from and the benefit of Korean Patent Application No. 10-2008-0047624, filed on May 22, 2008, which is hereby incorporated by reference for all purposes as if fully set forth herein.

BACKGROUND OF INVENTION

1. Field of the Invention

The present invention relates to a touch sensor that may be built in a liquid crystal display panel, a liquid crystal display panel including the touch sensor, and a method of driving the touch sensor.

2. Discussion of the Background

In general, a touch panel may be located at an uppermost position of an image display apparatus such that a user may directly touch menu contents displayed on a screen of the image display apparatus using a finger or stylus. The image display apparatus including the touch panel may sense a touch position according to an external force through the touch panel, may receive input signals corresponding to menu contents of the touched position, and may perform operations corresponding to the input signals.

The image display apparatus including the touch panel may not need to have additional input devices, such as keyboard, mouse, etc., connected to the image display apparatus, which may allow it to be widely applied to electronic instruments.

Recently, the touch panel has been applied to a liquid crystal display. In this case, the touch panel may be located at upper position of a liquid crystal display panel and may detect position information based on forces applied by a user. However, since the touch panel and the liquid crystal display panel are independent from each other even though they are coupled to each other, optical properties of the liquid crystal display, such as the brightness or viewing angle, may deteriorate. In addition, a thickness of the liquid crystal display may increase by a thickness of the touch panel.

SUMMARY OF INVENTION

The present invention provides a touch sensor that may be built in a liquid crystal display panel to accurately sense a touch location.

The present invention also provides a liquid crystal display panel including the touch sensor.

The present invention also provides a sensing method using the touch sensor.

Additional features of the invention will be set forth in the description which follows, and in part will be apparent from the description, or may be learned by practice of the invention.

The present invention discloses a touch sensor installed inside a liquid crystal display panel that displays an image. The touch sensor includes a light sensing part to generate a control signal corresponding to a variation in external light when the liquid crystal display panel is touched, a capacitance sensing part to change the control signal according to a variation in capacitance when the liquid crystal display panel is touched, and a sensing signal output part to generate a sensing signal in response to the control signal and decide an output timing of the sensing signal.

The present invention also discloses a liquid crystal display including a liquid crystal display panel that includes a plurality of gate lines, a plurality of data lines, a plurality of thin film transistors, each of which is connected to a corresponding gate line and a corresponding data line, and a plurality of first liquid crystal capacitors respectively connected to the thin film transistors to display an image. The liquid crystal display also includes a touch sensor that senses a variation in external light and a variation in cell gap to sense a touch event, and the touch sensor is installed in the liquid crystal display panel.

The present invention also discloses a method of driving a touch sensor includes generating a control corresponding to a variation in an amount of external light using a photodiode installed in a liquid crystal display panel when the liquid crystal display panel is touched, changing the control signal is changed according to a variation in a capacitance of a liquid crystal capacitor installed in the liquid crystal display panel when the liquid crystal display panel is touched, and generating a sensing signal in response to the control signal, and outputting the sensing signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
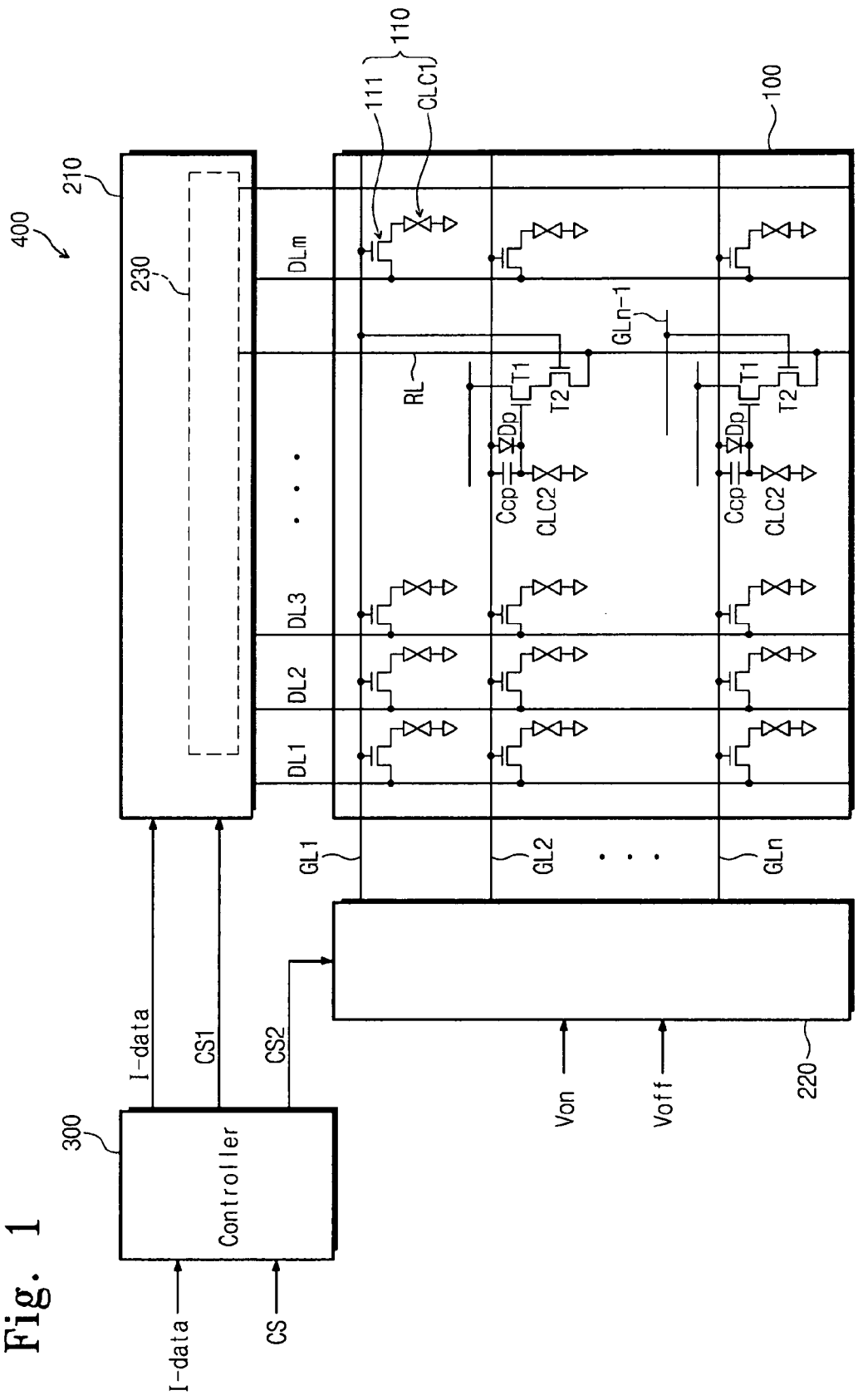
FIG. 1 is a plan view showing a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to", or "coupled to" another element or layer, it can be directly on, directly connected to, or directly coupled to the other element or layer or intervening elements or layers may be present. In contrast, when an element is referred to as being "directly on," "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another region, layer, or section.

Spatially relative terms, such as "beneath", "below", "lower", "above", "upper", and the like, may be used herein for ease of description to describe one element or feature's relationship to another element(s) or feature(s) as shown in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

FIG. 1 is a plan view showing a liquid crystal display according to an exemplary embodiment of the present invention.

Referring to FIG. 1, a liquid crystal display 400 includes a liquid crystal display panel 100, a data driver 210, a gate driver 220, and a controller 300.

The controller 300 receives image data I-data and various control signals CS. The controller 300 converts the control signals CS to generate a data control signal CS1 and a gate control signal CS2. The controller 300 applies the data control signal CS1 and the image data I-data to the data driver 210 and applies the gate control signal CS2 to the gate driver 220.

The data driver 210 converts the image data I-data into data signals in response to the data control signal CS1. Responsive to the gate control signal CS2, the gate driver 220 applies a first gate driving voltage Von or a second gate driving voltage Voff to gate lines GL1~GLn as gate signals.

The liquid crystal display panel 100 includes a plurality of pixels arranged in the form of matrix. Particularly, data lines DL1~DLm are arranged on the liquid crystal display panel 100, and the gate lines GL1~GLn are arranged on the liquid crystal display panel 100. The gate lines GL1~GLn cross the data lines DL1~DLm while being insulated from the data lines DL1~DLm to define a plurality of pixel areas in which the pixels 110 are arranged, respectively. As shown in FIG. 1, each pixel 110 includes a thin film transistor 111 and a first liquid crystal capacitor CLC1. Although not shown in FIG. 1, each pixel 110 may further include a storage capacitor connected to the first liquid crystal capacitor CLC1 in parallel. The data lines DL1~DLm are connected to the data driver 210 to receive the data signals, and the gate lines GL1~GLn are connected to the gate driver 220 to sequentially receive the gate signals.

The thin film transistor 111 is connected to a corresponding data line of the data lines DL1~DLm and a corresponding gate line of the gate lines GL1~GLn, and the thin film transistor 111 transmits a corresponding data signal of the data signals in response to a corresponding gate signal of the gate signals. The first liquid crystal capacitor CLC1 is connected to the thin film transistor 111 to receive the data signal.

Figure 2:
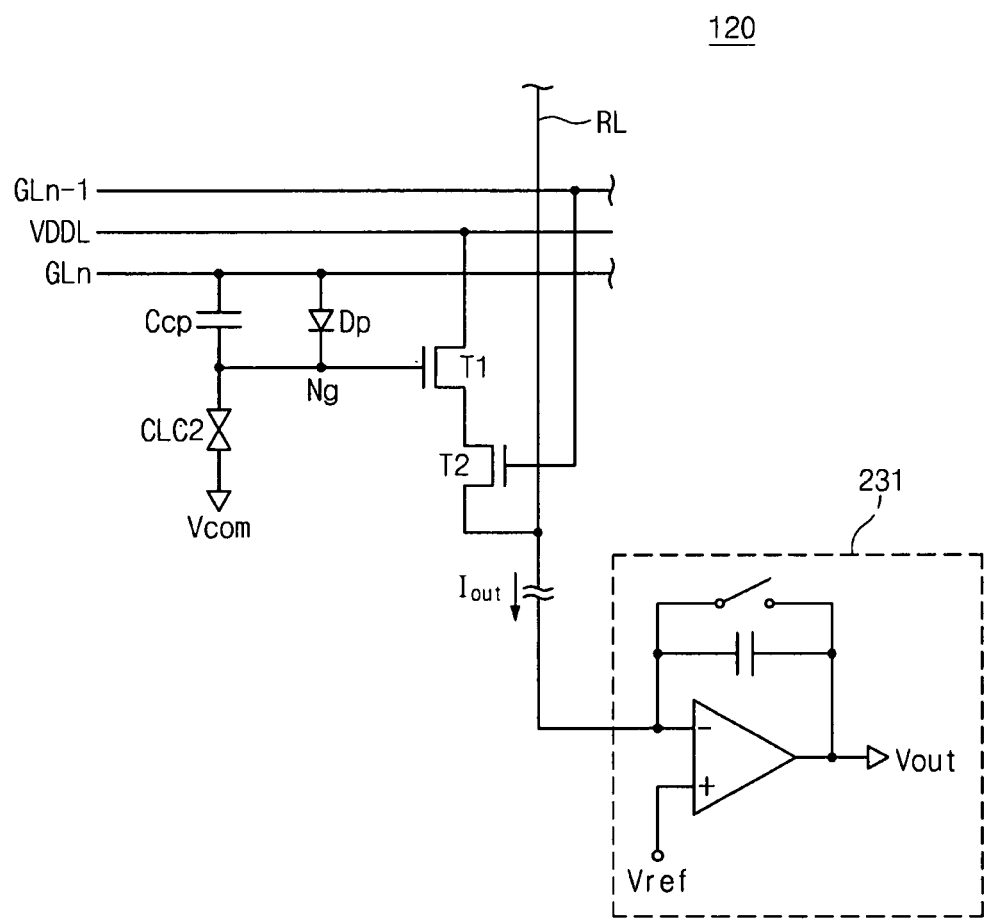
FIG. 2 is a circuit diagram showing a touch sensor according to an exemplary embodiment of the present invention.

A plurality of touch sensors 120 are built in the liquid crystal display panel 100. As shown in FIG. 2, each touch sensor 120 may include a photodiode Dp, a second liquid crystal capacitor CLC2, and a coupling capacitor Ccp. Each touch sensor 120 may be arranged in a black matrix area defined adjacent to the pixel area. However, the black matrix may be partially removed from an area corresponding to an area in which the photodiode Dp is arranged, so that the photodiode Dp may receive an external light and sense an amount of external light. In addition, the photodiode Dp may sense the light reflected from an interior portion of the liquid crystal display panel 100, among the external light.

The photodiode Dp operates in response to the amount of the external light, which varies according to a user's touch operation of the liquid crystal display panel 100. That is, the amount of the external light is reduced in the area touched by the user, so that photocurrent does not flow through the photodiode Dp that is arranged in the touched area. However, since the amount of external light is not reduced in the area that is not touched by the user, relatively high photocurrent may flow through the photodiode Dp.

The second liquid crystal capacitor CLC2 performs functions different from those of the first liquid crystal capacitor CLC1 arranged in the pixel area. In other words, the second liquid crystal capacitor CLC2 may be used to sense variation in the cell gap of the liquid crystal display panel 100 when the liquid crystal display panel 100 is touched by the user. More particularly, when the liquid crystal display panel 100 is touched by the user, the cell gap of the liquid crystal display panel 100 decreases, so that the capacitance of the second liquid crystal capacitor CLC2 increases.

Each touch sensor 120 may further include a first transistor T1 and a second transistor T2. As shown in FIG. 1 and FIG. 2, since each touch sensor 120 has a structure in which the photodiode Dp is coupled to the second liquid crystal capacitor CLC2, each touch sensor 120 may sense not only the amount of external light but also the touch position of the liquid crystal display panel 100 according to the variation in cell gap. Accordingly, the touch sensitivity of the liquid crystal display panel 100 in which the touch sensors 120 are installed may be improved, thereby allowing the liquid crystal display panel 100 to accurately sense the touch position.

In addition, the number of the touch sensors 120 may be decided depending on the touch sensitivity and aperture ratio of the liquid crystal display panel 100. That is, when the number of the touch sensors 120 increases, the touch sensitivity may be improved, and the aperture ratio may be improved when the number of the touch sensors 120 decreases.

Figure 3:
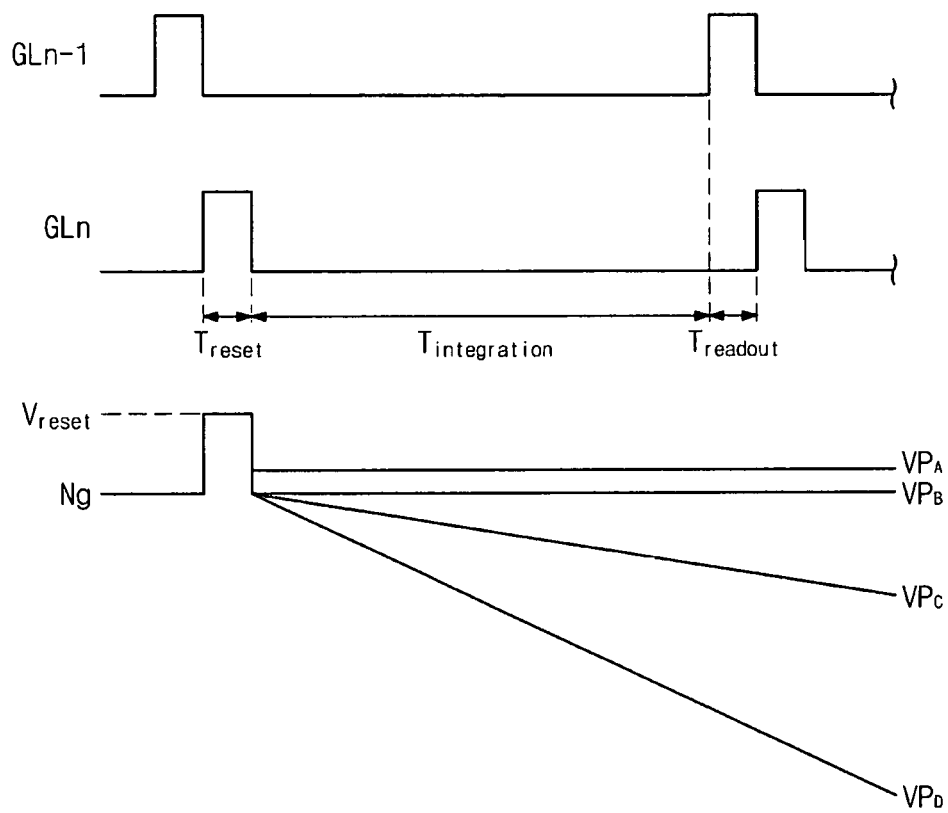
FIG. 3 is a waveforms diagram showing electric potentials of an $n^{th}$ gate signal, an $(n-1)^{th}$ gate signal, and a gate node.

FIG. 2 is a circuit diagram showing a touch sensor according an exemplary embodiment of to the present invention, and FIG. 3 is a waveforms diagram showing electric potentials of an $n^{th}$ gate signal, an $(n-1)^{th}$ gate signal, and a gate node.

Referring to FIG. 2, each touch sensor 120 includes a photodiode Dp, a second liquid crystal capacitor CLC2, a coupling capacitor Ccp, a first transistor T1, and a second transistor T2.

The photodiode Dp is connected to a first electrode of the second liquid crystal capacitor CLC2 and a first signal line. Particularly, the photodiode Dp has an anode connected to the first signal line and a cathode connected to the first electrode of the second liquid crystal capacitor CLC2. In the present exemplary embodiment, a node to which the photodiode Dp and the first electrode of the second liquid crystal capacitor CLC2 are connected is defined as a gate node Ng. The first signal line may be one of the gate lines GL1~GLn shown in FIG. 1, and FIG. 2 shows a structure in which the $n^{th}$ gate line GLn is the first signal line.

The coupling capacitor Ccp is connected to the gate node Ng and the first signal line GLn. The first transistor T1 includes a control terminal connected to the gate node Ng, an input terminal connected to a driving voltage line VDDL, and an output terminal connected to the second transistor T2. The second transistor T2 includes a control terminal connected to a second signal line to which a readout signal is applied, an input terminal connected to the output terminal of the first transistor T1, and an output terminal connected to the readout line RL.

In the present exemplary embodiment, the second signal line may be the $(n-1)^{th}$ gate line GLn−1 of the gate lines GL1~GLn. Thus, an $(n-1)^{th}$ gate signal is applied to the second signal line as the readout signal.

The readout line RL extends in a direction parallel to the data lines DL1~DLm as shown in FIG. 1 and is connected to a sensor driver 230 installed inside the data driver 210.

The sensor driver 230 includes an integrator 231 connected to the readout line RL therein. The integrator 231 includes a minus terminal (−) connected to the readout line RL and a plus terminal (+) to which a reference voltage Vref is applied. Thus, an output voltage Vout output from the integrator 231 has a minus polarity with respect to the reference voltage Vref.

Hereinafter, an operation of the touch sensor 120 will be described in detail with reference to FIG. 2 and FIG. 3.

As shown in FIG. 2 and FIG. 3, when the $n^{th}$ gate signal applied to the first signal line GLn is generated at a logic "high" state in an $i^{th}$ frame (i is a natural number equal to or larger than 1), the photodiode Dp is turned on, and thus an electric potential at the gate node Ng increases. That is, responsive to the $n^{th}$ gate signal (reset signal), the gate node Ng is reset to a reset voltage Vreset defined by the following Equation 1. In the present exemplary embodiment, the high period of the $n^{th}$ gate signal may be defined as a reset period Treset.

$$Vreset = Vhigh - Vth \qquad \text{Equation 1}$$

In Equation 1, Vhigh represents a high voltage of the $n^{th}$ gate signal and Vth represents a threshold voltage of the photodiode Dp.

Then, when the $n^{th}$ gate signal is changed to a logic "low" state, the electric potential of the gate node Ng decreases due to charge-coupling of the coupling capacitor Ccp and the second liquid crystal capacitor CLC2. In the present exemplary embodiment, a period during which the electric potential of the gate node Ng decreases may be defined as an integration period Tintegration. The electric potential (hereinafter, referred to a coupling voltage Vcoup) of the gate node Ng, which is decreased by the charge-coupling, is defined by the following Equation 2.

$$Vcoup = Vreset - (Vhigh - Vlow)\left(\frac{Ccp}{Ccp + Clc}\right) \qquad \text{Equation 2}$$

In Equation 2, Vlow represents a low voltage of the $n^{th}$ gate signal.

As represented in Equation 2, the coupling voltage Vcoup varies according to a capacitance ratio of the second liquid crystal capacitor CLC2 and the coupling capacitor Ccp. That is, when a touch event occurs at the liquid crystal display panel, the capacitance of the second liquid crystal capacitor CLC2 increases because the cell gap decreases. Thus, the coupling voltage Vcoup in the touched area is relatively high as compared to other areas.

The coupling voltage Vcoup varies according to the photodiode Dp after the $n^{th}$ gate signal is changed to the logic low state. In other words, the photodiode Dp has a relatively small reverse direction current since the external light incident to the photodiode Dp is blocked in the touched area, however the photodiode Dp has a relatively high photocurrent in other areas where the touch event does not occur since the external light is incident to the photodiode Dp.

Accordingly, during the period after the $n^{th}$ gate signal is changed to the logic low state to before the $(n-1)^{th}$ gate signal is generated at the logic high state, the electric potential of the gate node Ng is maintained at the coupling voltage Vcoup in the touched area, and the electric potential of the gate node Ng gradually decreases from the coupling voltage Vcoup in the other areas where the touch event does not occur due to the photocurrent of the photodiode Dp.

As described above, the electric potential difference occurs between the area in which the touch event occurs and the area in which the touch event does not occur, and thus a current value output from the first transistor T1 may vary.

Then, when the $(n-1)^{th}$ gate signal applied to the second signal line GLn-1 is changed to the logic high state in the $(i+1)^{th}$ frame, the second transistor T2 is turned on. Thus, the current value Iout output from the first transistor T1 is applied to the integrator 231 of the sensor driver 230 (shown in FIG. 1) through the second transistor T2 and the readout line RL. The integrator 231 outputs the voltage Vout corresponding to the current value Iout applied through the readout line RL. Therefore, the sensor driver 230 may sense whether the areas are touched or not based on the voltage level of the voltage Vout output from the integrator 231.

Figure 4:
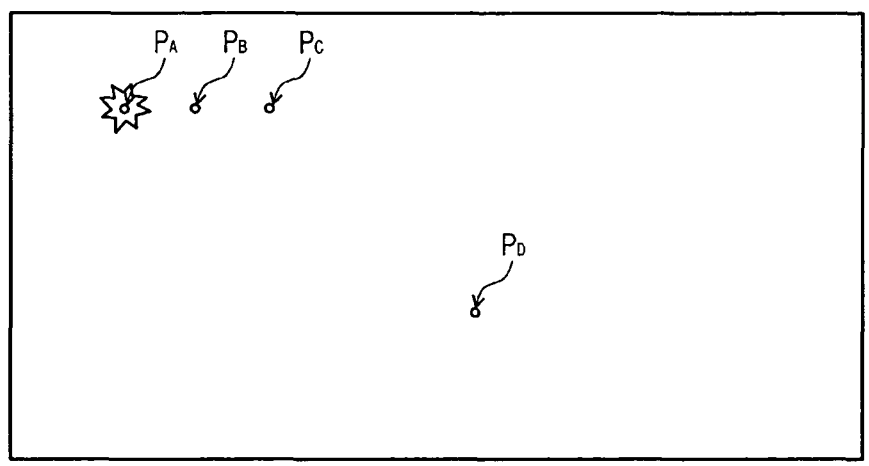
FIG. 4 is a schematic view showing a coupling voltage at a gate node according to a touch of a touch pen.

FIG. 4 is a schematic view showing a coupling voltage at a gate node Ng according to a touch of a finger or stylus.

Referring to FIG. 3 and FIG. 4, a first point $P_A$ represents an area touched by a finger or stylus (not shown), a second point $P_B$ and a third point $P_C$ represent shadow areas of the finger or stylus, and a fourth point $P_D$ represents an area not touched by the finger or stylus.

At the first point $P_A$, the gate node Ng is coupled to a first coupling voltage $VP_A$ due to increase of the liquid crystal capacitance and is maintained at the first coupling voltage $VP_A$ until the $(n-1)^{th}$ gate signal is generated since the external light is completely blocked. It may be assumed that external light is almost completely blocked at the second point $P_B$ since it is the shadow area of the first point $P_A$. However, the liquid crystal capacitance of the second point $P_B$ may not increase as compared to that of the first point $P_A$, so that the gate node Ng in the second point $P_B$ may be coupled to a second coupling voltage $VP_B$ that is lower than the first coupling voltage $VP_A$. The second point $P_B$ is maintained at the second coupling voltage $VP_B$ until the $(n-1)^{th}$ gate signal is generated.

The gate node Ng at the third point $P_C$ is coupled to a third coupling voltage $VP_C$. The third coupling voltage $VP_C$ may have the same level as the second coupling voltage $VP_B$, however, the third coupling voltage $VP_C$ may gradually decrease in time since a small amount of external light is incident to the third point $P_C$ as compared to the second point $P_B$. In case of the fourth point $P_D$, the external light is not blocked and the liquid crystal capacitance does not increase because the fourth point $P_D$ is not touched. As a result, a fourth coupling voltage $VP_D$ of the fourth point $P_D$ may be more greatly reduced than the third coupling voltage $VP_C$ of the third point $P_C$ that is in the shadow area of the first point $P_A$.

Figure 5:
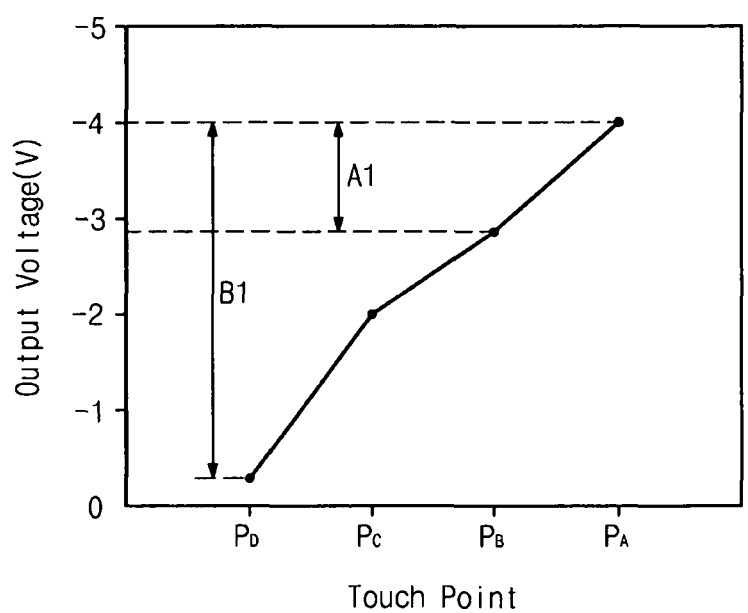
FIG. 5 is a graph showing an output voltage output from the integrator shown in FIG. 2 according to position.

FIG. 5 is a graph showing an output voltage output from an integrator 231 shown in FIG. 2 according to position. In FIG. 5, a first period A1 represents a change in the output voltage Vout depending upon the variation in the liquid crystal capacitance, and a second period B1 represents the change in the output voltage Vout depending on the value of the photocurrent of the photodiode Dp.

As shown in FIG. 5, the difference between the output voltage Vout in the touched area $P_A$ and the output voltage Vout in the shadow area $P_B$ may be represented due to a variation in the liquid crystal capacitance, thereby preventing malfunction and operation failure. Consequently, the sensor driver 230 may accurately sense the touch event based on the output voltage Vout to thereby accurately perform signal processing operation.

Figure 6:
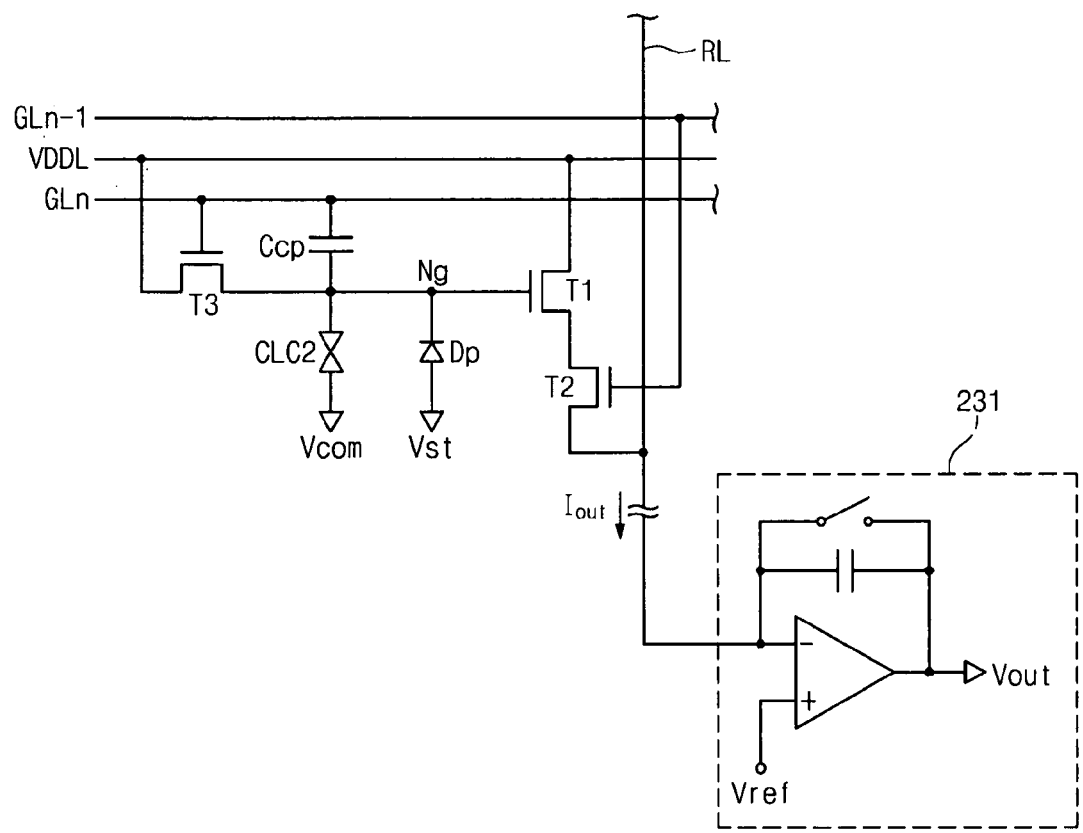
FIG. 6 is a circuit diagram showing a touch sensor according to another exemplary embodiment of the present invention.

FIG. 6 is a circuit diagram showing a touch sensor according to another exemplary embodiment of the present invention.

Referring to FIG. 6, a touch sensor 121 may include a photodiode Dp, a second liquid crystal capacitor CLC2, a coupling capacitor Ccp, a first transistor T1, a second transistor T2, and a third transistor T3.

The photodiode Dp is connected between a first electrode of the second liquid crystal capacitor CLC2 and a common voltage line (not shown) of the liquid crystal display panel 100 (shown in FIG. 1), to which a common voltage Vst is applied. Particularly, the photodiode Dp may include an anode connected to the common voltage line and a cathode connected to the first electrode of the second liquid crystal capacitor CLC2. In the present exemplary embodiment, a node at which the photodiode Dp and the first electrode of the second liquid crystal capacitor CLC2 are connected is defined as a gate node Ng. The third transistor T3 may include a control terminal connected to a first signal line, an input terminal connected to a driving voltage line VDDL, and an output terminal connected to the gate node Ng.

The first signal line corresponds to the $n^{th}$ gate line of the gate lines GL1~GLn shown in FIG. 1, so that the third transistor T3 is turned on during a high period when the $n^{th}$ gate signal applied is to the first signal line GLn. Thus, the gate node Ng is reset to the driving voltage in the high period of the $n^{th}$ gate signal.

Then, when the $n^{th}$ gate signal is changed to the logic low state, the electric potential of the gate node Ng decreases due to charge-coupling of the coupling capacitor Ccp and the second liquid crystal capacitor CLC2. The electric potential of the gate node, which may be decreased by the charge-coupling, is defined as a coupling voltage Vcoup. The coupling voltage Vcoup varies according to the capacitance ratio of the second liquid crystal capacitor CLC2 and the coupling capacitor Ccp. That is, when the touch event occurs at the liquid crystal display panel 100, the capacitance of the second liquid crystal capacitor CLC2 increases. Accordingly, the coupling voltage Vcoup in a touched area may be relatively higher than that in other areas.

The coupling voltage Vcoup varies according to the photodiode Dp after the $n^{th}$ gate signal is changed to the logic low state. That is, since external light is blocked at the touched area, the photodiode Dp may operate under the reverse bias so the photocurrent does not flow through the photodiode Dp. However, since external light is incident to the photodiode Dp in the other areas, the photocurrent may increase remarkably.

Thus, after the $n^{th}$ gate signal is changed to the logic low state and before the $(n-1)^{th}$ gate signal is generated at the logic high state, the electric potential of the gate node Ng may be maintained at the coupling voltage Vcoup in the touched area. The electric potential of the gate node Ng may gradually decrease from the coupling voltage Vcoup in the other areas.

As described above, the coupling voltage is different in the area touched than in other areas, so the current value Iout output from the first transistor T1 varies.

Then, when the $(n-1)^{th}$ gate signal applied to the second signal line GLn-1 is changed to the logic high state in the $(i+)^{th}$ frame, the second transistor T2 is turned on. Accordingly, the current value Iout output from the first transistor T1 is applied to the integrator 231 of the sensor driver 230 (shown in FIG. 1) through the readout line RL.

Figure 7:
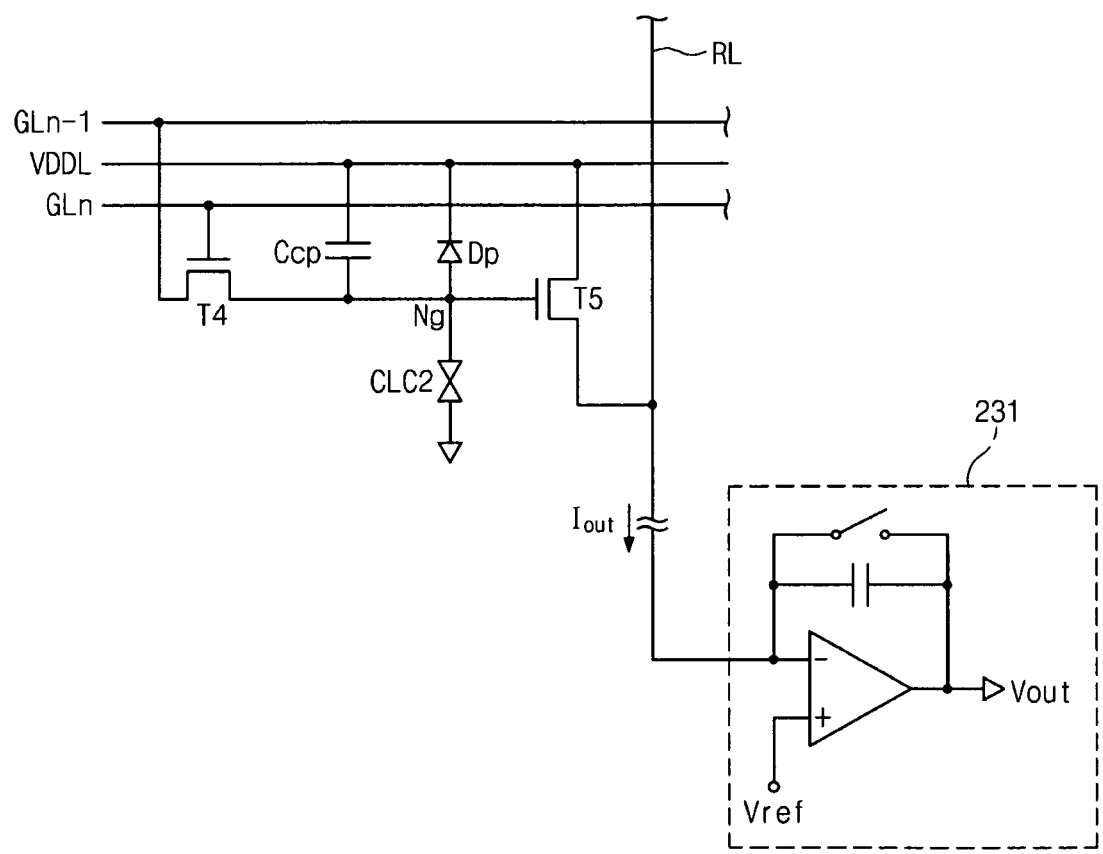
FIG. 7 is a circuit diagram showing a touch sensor according to another exemplary embodiment of the present invention.
Figure 8:
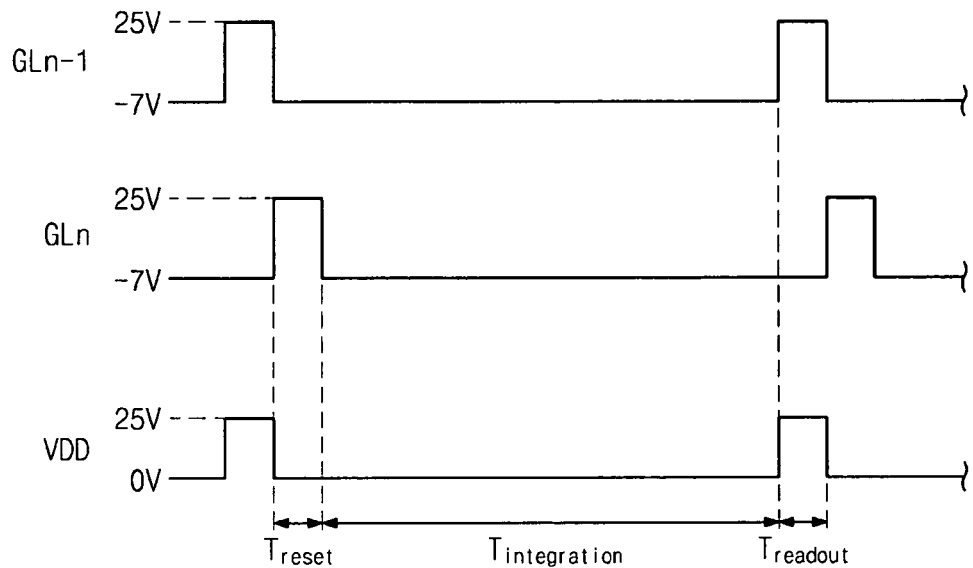
FIG. 8 is a waveforms diagram showing an $n^{th}$ gate signal, an $(n-1)^{th}$ gate signal, and a driving voltage.
Figure 9:
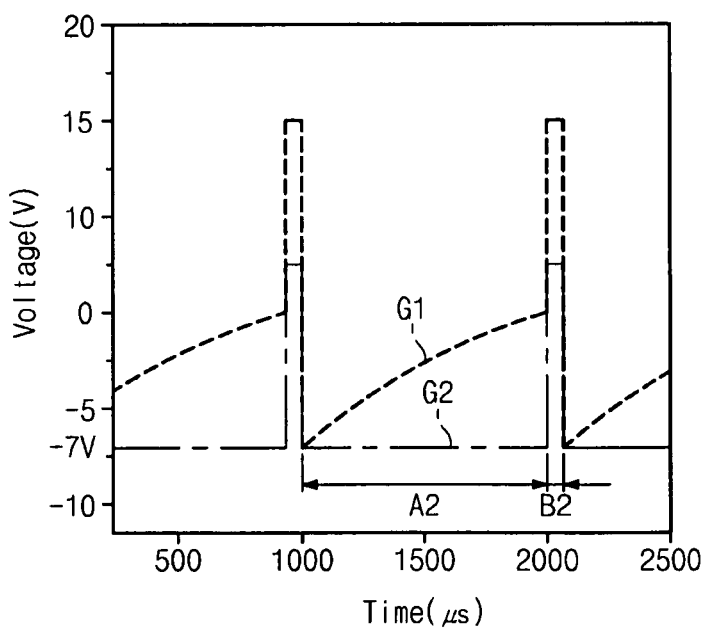
FIG. 9 is a graph showing an electric potential of a gate node over time.

FIG. 7 is a circuit diagram showing a touch sensor according to another exemplary embodiment of the present invention, FIG. 8 is a waveforms diagram showing an $n^{th}$ gate signal, an $(n-1)^{th}$ gate signal, and a driving voltage, and FIG. 9 is a graph showing an electric potential of a gate node over time. In FIG. 9, a first curve G1 represents an electric potential of a gate node Ng in an area that is not touched with reference over time and a second curve G2 represents the electric potential of the gate node Ng in the touched area over time.

Referring to FIG. 7, FIG. 8, and FIG. 9, a touch sensor 123 may include a photodiode Dp, a second liquid crystal capacitor CLC2, a coupling capacitor Ccp, a fourth transistor T4, and a fifth transistor T5.

The photodiode Dp is connected between a first electrode of the second liquid crystal capacitor CLC2 and a driving voltage line VDDL. Particularly, a cathode of the photodiode Dp is connected to the driving voltage line VDDL and an anode of the photodiode Dp is connected to the first electrode of the second liquid crystal capacitor CLC2. In the present exemplary embodiment, a node to which the photodiode Dp and the first electrode of the second liquid crystal capacitor CLC2 are connected is defined as a gate node Ng. The fourth transistor T4 may include a control terminal connected to a first signal line, an input terminal connected to a second signal line, and an output terminal connected to a gate node Ng.

The first signal line corresponds to the $n^{th}$ gate line GLn of the gate lines GL1~GLn shown in FIG. 1, and the second signal line corresponds to the $(n-1)^{th}$ gate line GLn-1. The fourth transistor T4 is turned on in the high period when the $n^{th}$ gate signal applied to the first signal line GLn. Thus, the gate node Ng is reset to the $(n-1)^{th}$ gate signal applied to the second signal line GLn-1 in the high period of the $n^{th}$ gate signal of the $i^{th}$ frame. The high period of the $n^{th}$ gate signal may be defined as a reset period Treset. In addition, the low voltage (e.g., −7 V) of the $(n-1)^{th}$ gate signal is defined as a reset voltage.

Meanwhile, a driving voltage VDD having the pulse shape and the same phase as the $(n-1)^{th}$ gate signal is applied to the driving voltage line VDDL. In one exemplary embodiment, the driving voltage VDD is maintained at a ground voltage (0 V) during a low period and maintained at the same voltage level as the high voltage (e.g., 25 V) of the $(n-1)^{th}$ gate signal during the high period.

Next, a period from after the reset period Treset to before the driving voltage VDD is generated at the logic high state in the $(i+)^{th}$ frame is defined as an integration period Tintegration. During the integration period Tintegration, the electric potential of the gate node Ng is decided by the photocurrent of the photodiode Dp. That is, the photodiode Dp may be operated under the reverse bias in the touched area and thus the photocurrent flowing through the photodiode Dp decreases, so that the gate node Ng may be maintained at the reset voltage (−7 V). However, since the photocurrent of the photodiode Dp increases in the areas that are not touched, the gate node Ng is charged with the low voltage (0 V) of the driving voltage VDD. As described above, the gate node Ng has a voltage difference of about 7 V according to whether a touch event occurs or not.

As shown in FIG. 9, the electric potential difference of the gate node Ng between the touched area and the other areas occurs in a third period A2 due to the amount of external light incident to the photodiode Dp.

The fifth transistor T5 includes a control terminal connected to the gate node Ng, an input terminal connected to the driving voltage line VDDL, and an output terminal connected to the readout line RL. The coupling capacitor Ccp is connected between the driving voltage line VDDL and the gate node Ng.

When the driving voltage VDD is generated in the logic high state in the $(i+1)^{th}$ frame, the electric potential of the gate node Ng increases due to charge-coupling of the coupling capacitor Ccp and the second liquid crystal capacitor CLC2. In the present exemplary embodiment, the high period of the driving voltage VDD is defined as a readout period Treadout.

The electric potential of the gate node Ng varies according to the capacitance ratio between the second liquid crystal capacitor CLC2 and the coupling capacitor Ccp. That is, since the cell gap decreases in the touch area of the liquid crystal display panel 100, the capacitance of the second liquid crystal capacitor CLC2 increases compared to that in the areas that are not touched. Accordingly, the electric potential of the gate node Ng increases more in the areas that are not touched than in the touched area due to the charge-coupling.

In a fourth period B2 of FIG. 9, the electric potential difference of the gate node Ng between the touch area and the non-touch area occurs by the capacitance of the second liquid crystal capacitor CLC2.

The current Iout output from the fourth transistor T4 varies according to the electric potential of the gate node Ng, and the current value Iout is applied to the integrator 231 of the sensor driver 230 through the readout line RL.

Figure 10:
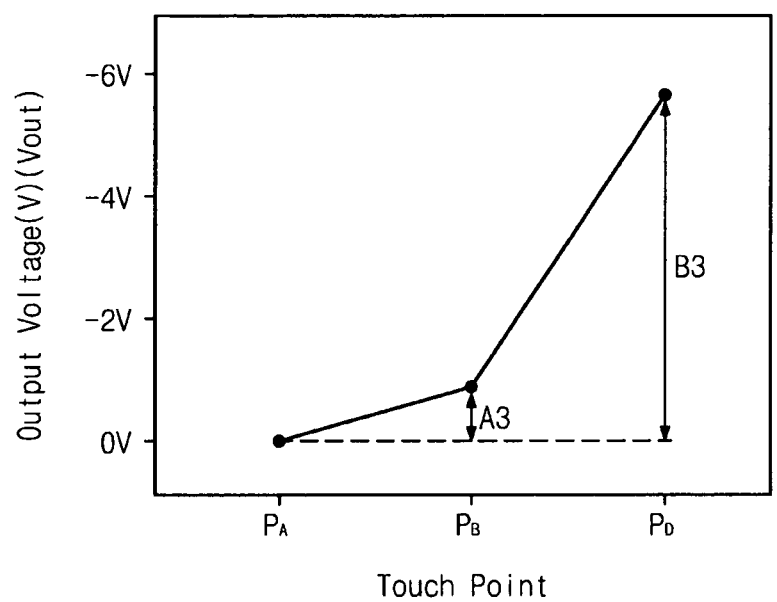
FIG. 10 is a graph showing an output voltage output from the integrator shown in FIG. 7 according to position.

FIG. 10 is a graph showing an output voltage output from the integrator shown in FIG. 7 according to position. In FIG. 10, a fifth period A3 represents a the change in the output voltage Vout depending upon the variation of the liquid crystal capacitance and a sixth period B3 represents the change in the output voltage Vout depending upon the value of the photocurrent of the photodiode Dp.

As shown in FIG. 10, the difference between the output voltage Vout of a first point $P_A$ of the touch area and the output voltage Vout of a second point $P_B$ having the same amount of external light as the first point $P_A$ may be represented due to variation in the liquid crystal capacitance. In addition, the difference between the output voltage Vout at the first point $P_A$ of the touch area and at a fourth point $P_D$ that is not in the touched area occurs due to differences in the amount of external light and the liquid crystal capacitance. Thus, malfunction and operation failure caused by the shadow effect may be prevented. In addition, since the difference between the output voltage at the touch area and at the other areas increases, the sensor driver may accurately sense the touch event.

Figure 11:
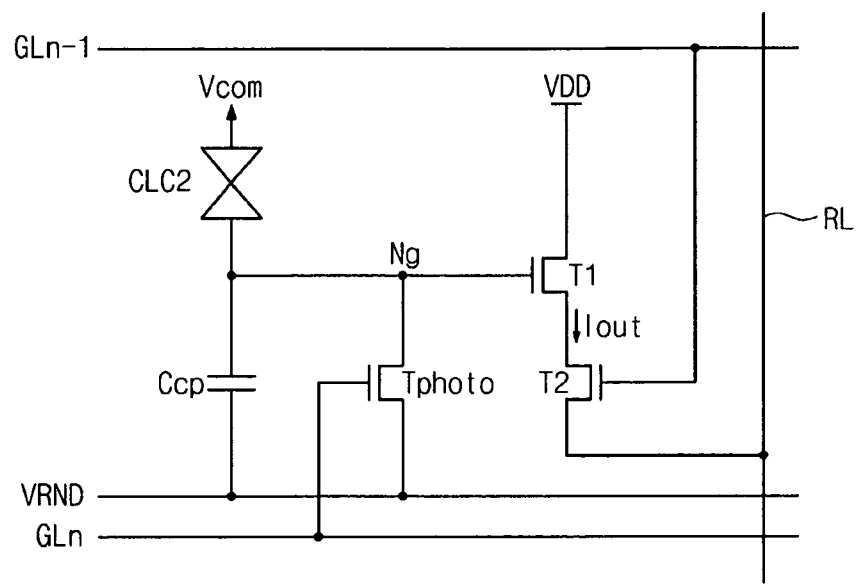
FIG. 11 is a circuit diagram showing a touch sensor according to another exemplary embodiment of the present invention.
Figure 12:
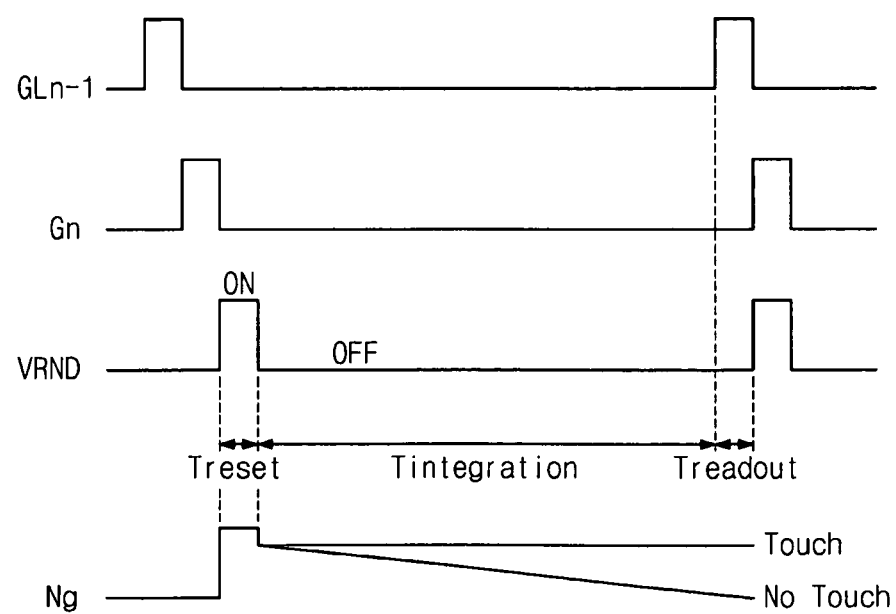
FIG. 12 is a timing diagram showing an $n^{th}$ gate signal, an $(n-1)^{th}$ gate signal, and a reset voltage.

FIG. 11 is a circuit diagram showing a touch sensor according to another exemplary embodiment of the present invention, and FIG. 12 is a timing diagram showing an $n^{th}$ gate signal, an $(n-1)^{th}$ gate signal, and a reset voltage.

Referring to FIG. 11, a touch sensor 120 may include a phototransistor Tphoto, a second liquid crystal capacitor CLC2, a coupling capacitor Ccp, first and second transistors T1 and T2, and first, second, and third signal lines. In the present exemplary embodiment, the first signal line is defined as a signal line to which a reset signal VRND is applied, the second signal line is defined as an $(n-1)^{th}$ gate line GLn-1 (n is a natural number equal to or greater than 2) of the gate lines shown in FIG. 1, and the third signal line is defined as an $n^{th}$ gate line GLn.

The phototransistor Tphoto may include an output terminal connected to a first electrode of the second liquid crystal capacitor CLC2, an input terminal connected to the first signal line to receive the reset signal VRND, and a control terminal connected to the third signal line GLn to receive an $n^{th}$ gate signal.

As shown in FIG. 12, when the $n^{th}$ gate signal applied to the first signal line GLn is generated in a logic "high" state within an $i^{th}$ frame (i is a natural number equal to or greater than 1), the phototransistor Tphoto is turned on and the reset signal VRND is applied to the gate node Ng through the turned-on phototransistor Tphoto. Since the reset signal VRND has the same phase as that of the $n^{th}$ gate signal, the reset signal VRND has the high voltage level during the high period of the $n^{th}$ gate signal. Accordingly, when the phototransistor Tphoto is turned on, the electric potential of the gate node Ng increases. The high period of the n$^{th}$ gate signal may be defined as a reset period Treset.

Then, when the n$^{th}$ gate signal is changed to a logic "low" state, the electric potential of the gate node Ng decreases due to charge-coupling of the coupling capacitor Ccp and the second liquid crystal capacitor CLC2. In the present exemplary embodiment, a period during which the electric potential of the gate node Ng decreases may be defined as an integration period Tintegration.

The electric potential of the gate node Ng may vary according to a capacitance ratio of the second liquid crystal capacitor CLC2 and the coupling capacitor Ccp. That is, when a touch event occurs at the liquid crystal display panel, the capacitance of the second liquid crystal capacitor CLC2 increases because the cell gap decreases. Thus, the gate node Ng in the touched area may be relatively low as compared to other areas.

In addition, during the integration period Tintegration, the electric potential of the gate node Ng may be decided according to the light amount of an external light applied to the phototransistor Tphoto. That is, the photocurrent may be relatively small in the touched area since external light incident to the phototransistor Tphoto in the touched area is blocked, and the photocurrent may be relatively great in the other areas since external light incident to the other areas is not blocked.

Accordingly, during the integration period Tintegration, the electric potential of the gate node Ng may maintained in the touched area, but the electric potential of the gate node Ng may gradually decrease in the other areas due the photocurrent of the phototransistor Tphoto.

As described above, the electric potential difference occurs between the touched area and the other areas, and thus a current value output from the first transistor T1 may vary.

Then, when the (n−1)$^{th}$ gate signal applied to the second signal line GLn−1 is changed to the logic high state in the (i+1)$^{th}$ frame, the second transistor T2 is turned on. Thus, the current value Iout output from the first transistor T1 is applied to the integrator 231 of the sensor driver 230 (shown in FIG. 1) through the second transistor T2 and the readout line RL. The integrator 231 outputs the voltage Vout corresponding to the current value Iout applied through the readout line RL. Therefore, the sensor driver 230 may sense whether the areas are touched or not based on the voltage level of the voltage Vout output from the integrator 231.

The photocurrent of the phototransistor Tphoto varies according to the external luminance. In other words, when the external luminance increases, the photocurrent increases, and when the external luminance decreases, the photocurrent decreases. Thus, when the photocurrent of the phototransistor Tphoto varies due to a variation in the external luminance, the discharge amount from the gate node Ng varies during a time interval of no-touch event. Consequently, the output voltage Vout from the integrator 231 varies, which may prevent the sensor driver 230 from accurately sensing touch events. In order to prevent the discharge amount at the gate node Ng from varying according to the external luminance, the present exemplary embodiment provides a circuit that varies an off voltage VRND_OFF of the reset signal VRND according to the external luminance.

Figure 13:
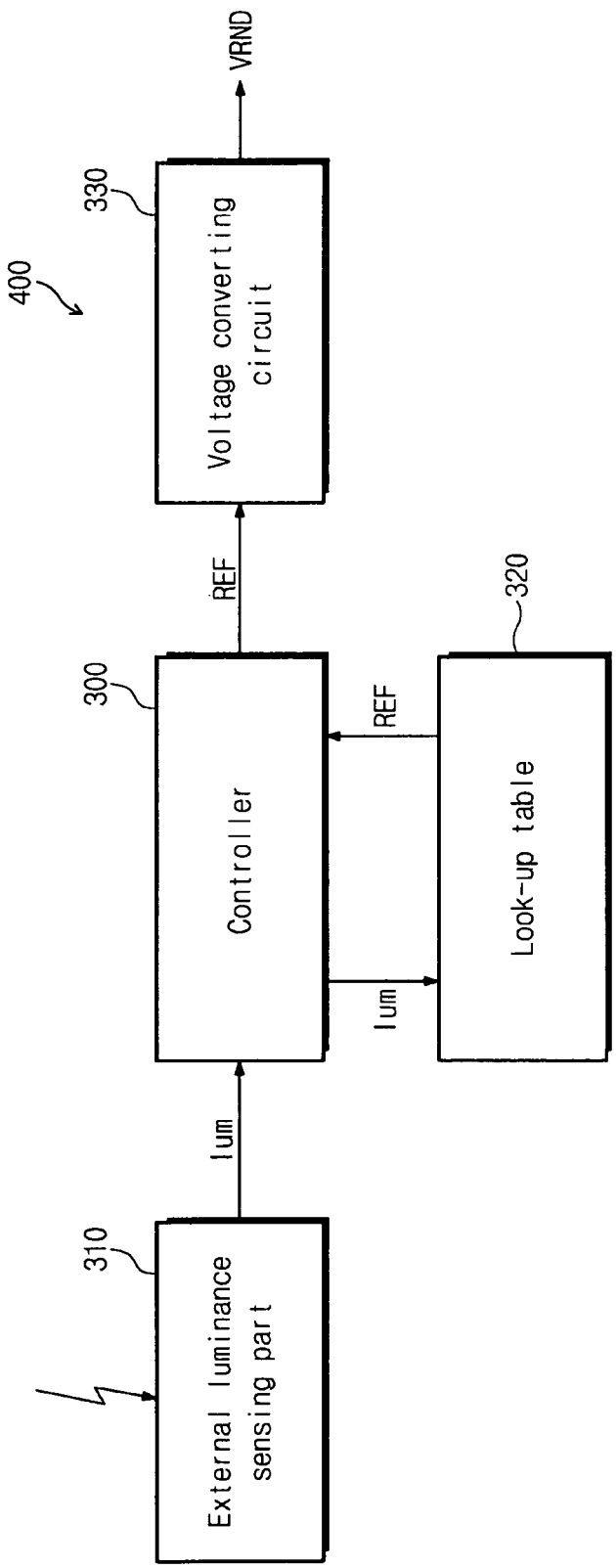
FIG. 13 is a block diagram showing a circuit of varying the reset voltage shown in FIG. 12.
Figure 14:
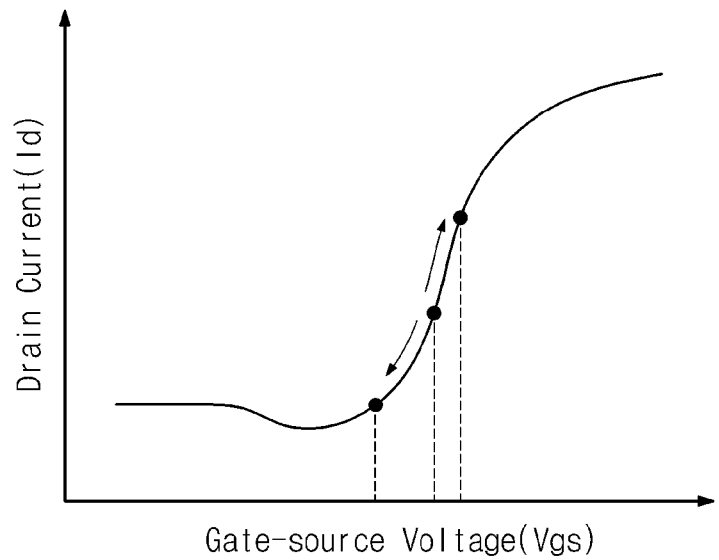
FIG. 14 is a graph showing a drain current according to a gate-source voltage.

FIG. 13 is a block diagram showing a circuit in which the reset voltage shown in FIG. 12 varies, and FIG. 14 is a graph showing a drain current according to a gate-source voltage.

Referring to FIG. 13, the liquid crystal display 400 further includes an external luminance sensing part 310, a look-up table 320, and a voltage converting circuit 330.

The external luminance sensing part 310 may include a photo sensor that senses the external luminance. The external luminance sensing part 310 may be installed inside the liquid crystal display panel 110 (refer to FIG. 1) or arranged outside the liquid crystal display panel 110. In addition, the external luminance sensing part 310 may be replaced with a photo sensor applied to the liquid crystal display 400 for a dimming operation. The external luminance sensing part 310 provides a sensing signal lum to the controller 300. The sensing signal lum varies according to the external luminance. The controller 300 reads out reference data REF from the look-up table 320 in response to the sensing signal lum and applies the reference data REF to the voltage converting circuit 330.

The voltage converting circuit 330 varies the reset signal VRND based on the reference data REF. When the external luminance is higher than a reference luminance, the voltage converting circuit 330 increases the off voltage VRND_OFF of the reset signal VRND according to the reference data REF, and when the external luminance is lower than the reference luminance, the voltage converting circuit 330 decreases the off voltage VRND_OFF of the reset signal VRND according to the reference data REF. As described above, when the off voltage VRND_OFF of the reset signal VRND is adjusted, the gate-source voltage Vgs of the phototransistor Tphoto may vary.

As shown in FIG. 14, when the gate-source voltage Vgs of the phototransistor Tphoto decreases, the drain current Id decreases. To the contrary, when the gate-source voltage Vgs of the phototransistor Tphoto increases, the drain current Id increases. Thus, in case that the photocurrent of the phototransistor Tphoto increases due to the high external luminance, the off voltage VRND_OFF of the reset signal VRND increases. As a result, the gate-source voltage Vgs of the phototransistor Tphoto decreases and also the drain current Id of the phototransistor Tphoto decreases. In addition, when the photocurrent of the phototransistor Tphoto decreases due to the low external luminance, the off voltage VRND_OFF of the reset signal VRND decreases. Accordingly, the gate-source voltage Vgs and the drain current Id of the phototransistor Tphoto increases.

Thus, the variation of the gate node Ng due to the external luminance may be prevented when a touch event does not occur, thereby allowing touch events to be sensed accurately.

Figure 15A:
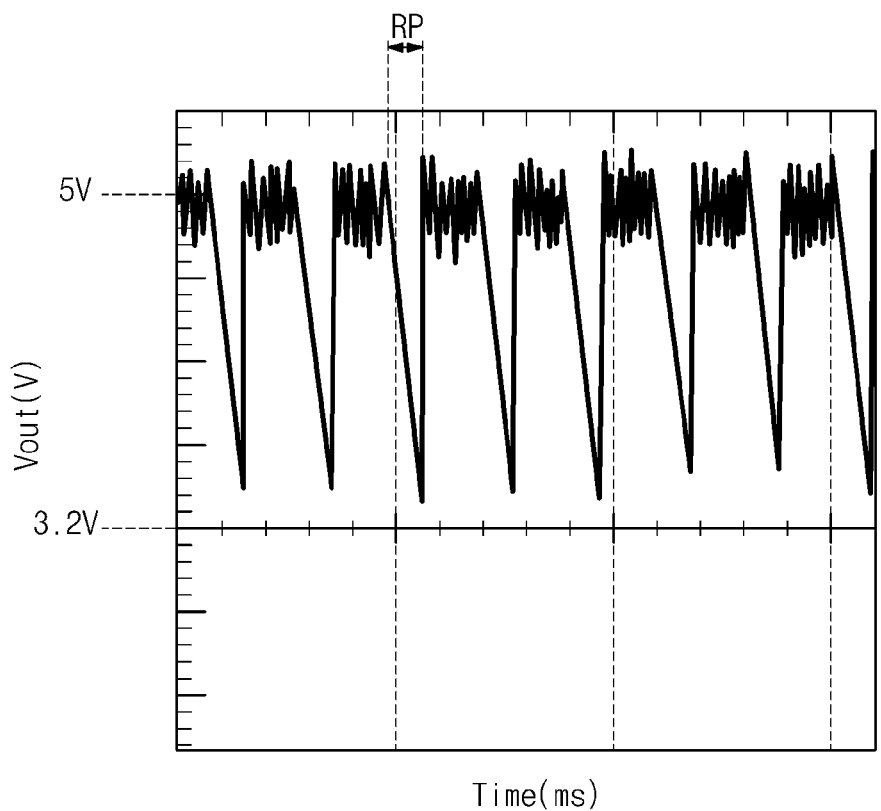
FIG. 15A, FIG. 15B, and FIG. 15C are graphs showing output voltages of an integrator according to a time interval when the touch sensor is not touched.
Figure 15B:
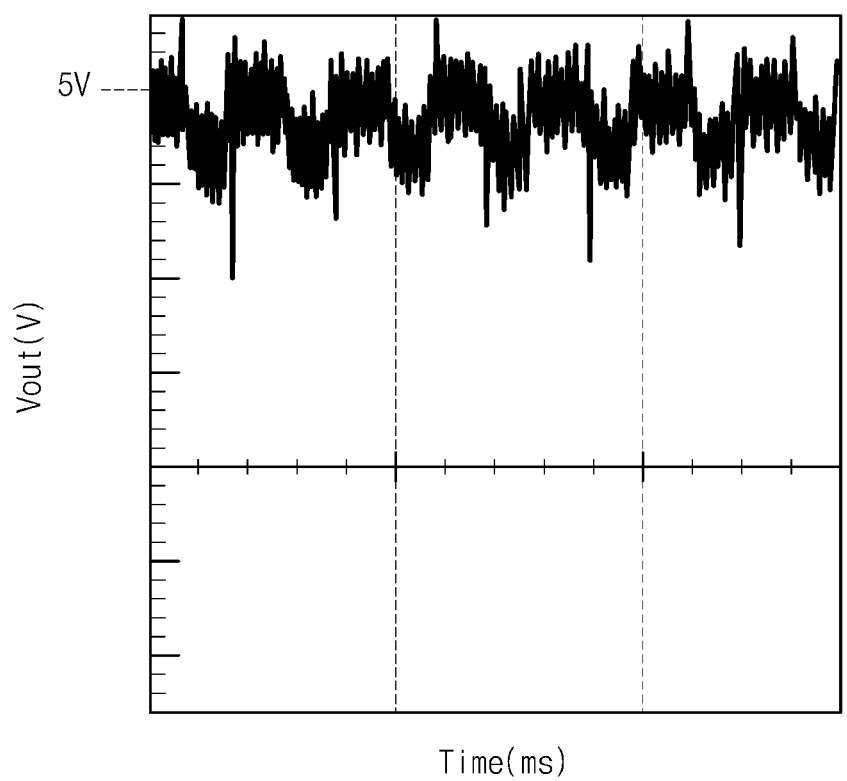
Figure 15C:
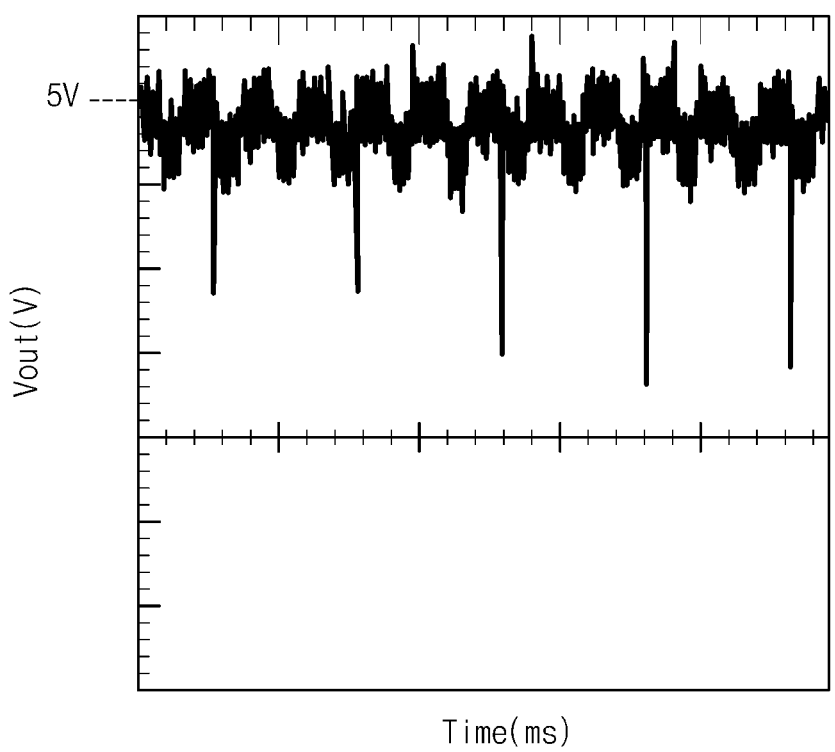

FIG. 15A, FIG. 15B, and FIG. 15C are graphs showing output voltages of an integrator according to a time interval when the touch sensor is not touched. More particularly, FIG. 15A is a graph showing that the external luminance is about 350 lux and the off voltage VRND_OFF of the reset signal is about −5 V, FIG. 15B is a graph showing that the external luminance is about 1000 lux and the off voltage VRND_OFF of the reset signal is about −5 V, and FIG. 15C is a graph showing that the external luminance is about 350 lux and the off voltage VRND_OFF of the reset signal is −6 V.

Referring to FIG. 15A, when a touch event does not occur while the external luminance is about 350 lux and the off voltage VRND_OFF of the reset signal is about −5 V, the output voltage Vout of the integrator 231 (refer to FIG. 2) gradually decreases from about 5 V to about 3.2 V during the readout period RP.

As shown in FIG. 15B, when increasing the external luminance to about 1000 lux, the output voltage Vout of the integrator 231 may be maintained at about 5 V while a touch event does not occur. Consequently, when the external luminance decreases, the photocurrent of the phototransistor Tphoto may decrease, thereby reducing the discharge amount from the gate node Ng. Thus, the output voltage Vout of the integrator 231 may decrease to about 3.2 V in the readout period RP.

Referring to FIG. 15C, when decreasing the off voltage VRND_OFF of the reset signal to about −6 V while the external luminance is about 350 lux, the gate-source voltage Vgs of the phototransistor Tphoto may increases so that the discharge amount of the gate node Ng may increase again. Accordingly, the output voltage Vout of the integrator 231 may be maintained at about 5 V when a touch event does not occur.

Figure 16:
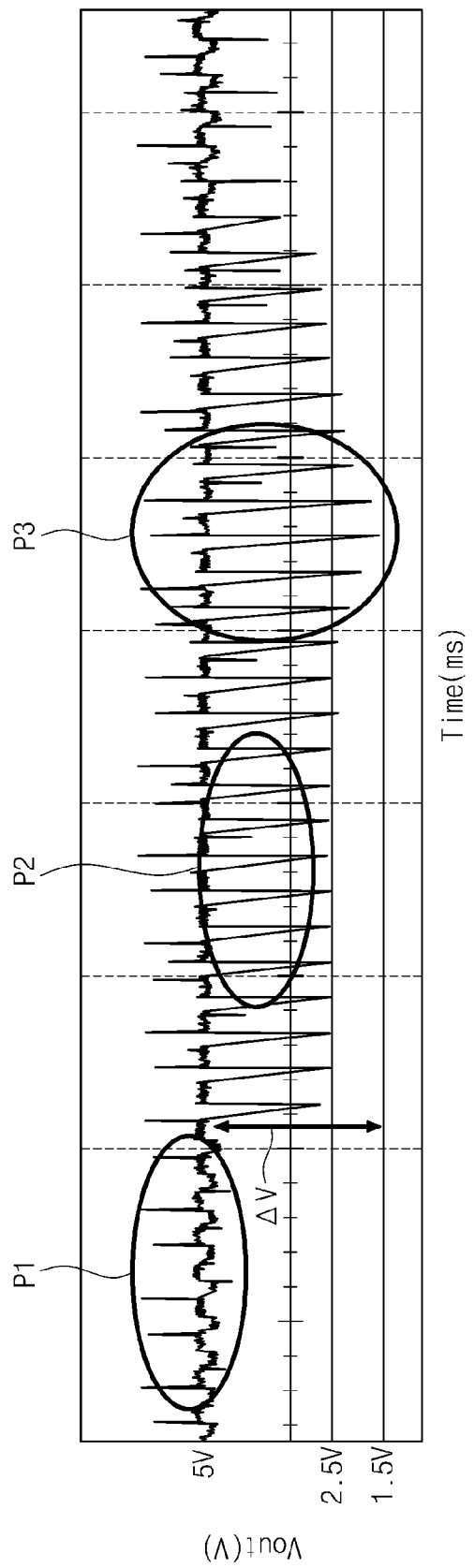
FIG. 16 is a graph showing an output voltage according to a time interval of touch and no-touch events.

FIG. 16 is a graph showing an output voltage according to a time interval of touch and no-touch events. In FIG. 16, a first period P1 indicates a period for which a touch event does not occur, a second period P2 indicates a period for which the touch event with a force of about 100 gF occurs, and a third period P3 indicates a period for which a touch event with a force of about 150 gF occurs.

Referring to FIG. 16, the output voltage Vout of the integrator 231 (refer to FIG. 2) is maintained at about 5 V while the touch event does not occur, but when the touch event occurs with a force of about 100 gF, the output voltage Vout of the integrator 231 may decrease to about 2.5 V. In addition, when the touch event occurs by applying the force of about 150 gF, the output voltage Vout may decrease to about 1.5 V. Thus, the voltage difference between the touch event and the no-touch event may increase to about 3.5 V, so that the touch and no-touch events may be accurately sensed even if the external luminance varies.

According to the above, the touch sensor may sense a variation in the amount of external light and the cell gap by simultaneously using the light sensing part and the capacitance sensing part. Thus, malfunctioning operations caused by a shadow effect of the light sensing method and a low surround luminance of the capacitance sensing method may be prevented, and a sensing operation may be accurately performed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A touch sensor installed inside a liquid crystal display panel that displays an image, the touch sensor comprising:
   a light sensing part to generate a control signal corresponding to a variation in external light when the liquid crystal display panel is touched;
   a capacitance sensing part comprising a liquid crystal capacitor to change the control signal according to a variation of capacitance when the liquid crystal display panel is touched; and
   a sensing signal output part to generate a sensing signal in response to the control signal and decide an output timing of the sensing signal,
   wherein the capacitance varies according to a change in cell gap of the liquid crystal capacitor.

2. The touch sensor of claim 1, wherein the light sensing part comprises a photodiode connected to the liquid crystal capacitor.

3. The touch sensor of claim 2, further comprising a coupling capacitor to change the control signal according to a ratio between a capacitance of the coupling capacitor and a capacitance of the liquid crystal capacitor,
   wherein the photodiode, the liquid crystal capacitor, and the coupling capacitor are all connected to a first node.

4. The touch sensor of claim 3, further comprising:
   a first signal line connected to a first electrode of the coupling capacitor and an anode of the photodiode, the first signal line to receive a reset signal;
   a second signal line to apply a readout signal to the sensing signal output part; and
   a readout line to output the sensing signal, and
   wherein a cathode of the photodiode and a second electrode of the coupling capacitor are connected to the first node.

5. The touch sensor of claim 4, wherein the first signal line and the second signal lines comprise an $n^{th}$ gate line and an $(n-1)^{th}$ gate line of gate lines arranged in the liquid crystal display panel, respectively, where n is a natural number equal to or greater than 2, the reset signal corresponds an $n^{th}$ gate signal applied to the $n^{th}$ gate line in an $i^{th}$ frame (i is a natural number equal to or greater than 1), and the readout signal corresponds to an $(n-1)^{th}$ gate signal applied to the $(n-1)^{th}$ gate line in an $(i+1)^{th}$ frame.

6. The touch sensor of claim 4, wherein the sensing signal output part comprises:
   a first transistor connected to the first node to output the sensing signal in response to the control signal; and
   a second transistor connected to the first transistor to switch the sensing signal output from the first transistor in response to the readout signal.

7. The touch sensor of claim 6, wherein the first transistor comprises:
   a control terminal connected to the first node;
   an input terminal connected to a driving voltage line to which a driving voltage is applied; and
   an output terminal connected to the second transistor, and
   wherein the second transistor comprises:
   an input terminal connected to the output terminal of the first transistor;
   a control terminal connected to the second signal line; and
   an output terminal connected to the readout line.

8. The touch sensor of claim 3, wherein a cathode of the photodiode is connected to the first node, and an anode of the photodiode arranged in the liquid crystal display panel is connected to a common voltage line to which a driving voltage is applied.

9. The touch sensor of claim 8, further comprising:
   a first signal line connected to a first electrode of the coupling capacitor, the first signal line to receive a reset signal;
   a second signal line to apply a readout signal to the sensing signal output part; and
   a readout line to output the sensing signal, and
   wherein a second electrode of the coupling capacitor is connected to the first node.

10. The touch sensor of claim 9, wherein the first signal line and the second signal line comprise an $n^{th}$ gate line and an $(n-1)^{th}$ gate line of gate lines arranged in the liquid crystal display panel, respectively.

11. The touch sensor of claim 9, wherein the sensing signal output part comprises a first transistor and a second transistor,
   the first transistor comprises a control terminal connected to the first node, an input terminal connected to a driving voltage line to which a driving voltage is applied, and an output terminal connected to the second transistor, and
   the second transistor comprises an input terminal connected to the output terminal of the first transistor, a control terminal to receive the readout signal, and an output terminal connected to the readout line.

12. The touch sensor of claim 11, further comprising a third transistor comprising a control terminal connected to the first signal line, an input terminal connected to the driving voltage line, and an output terminal connected to the first node.

13. The touch sensor of claim 3, further comprising:
a first signal line to receive a switching signal;
a second signal line to receive a reset signal;
a driving voltage line to receive a driving voltage having the same phase and the same pulse shape as those of the reset signal; and
a readout line to output the sensing signal.

14. The touch sensor of claim 13, wherein a first electrode of the coupling capacitor and a cathode of the photodiode are connected to the driving voltage line, and a second electrode of the coupling capacitor and an anode of the photodiode are connected to the first node.

15. The touch sensor of claim 14, wherein the sensing signal output part comprises a first transistor comprising a control terminal connected to the node, an input terminal connected to the driving voltage line, and an output terminal connected to the readout line, and
wherein the first transistor outputs the sensing signal to the readout line in response to the control signal.

16. The touch sensor of claim 15, further comprising a second transistor comprising a control terminal connected to the first signal line, an input terminal connected to the second signal line, and an output terminal connected to the first node,
wherein the second transistor outputs the reset signal to the first node in response to the switching signal.

17. The touch sensor of claim 13, wherein the first signal line corresponds to an $n^{th}$ gate line of gate lines arranged in the liquid crystal display panel and receive an $n^{th}$ gate signal as the switching signal, and the second signal lines corresponds to an $(n-1)^{th}$ gate line of the gate lines and receive an $(n-1)^{th}$ gate signal as the reset signal.

18. The touch sensor of claim 1, wherein the light sensing part comprises a phototransistor, and the capacitance sensing part comprises a liquid crystal capacitor connected to the phototransistor.

19. The touch sensor of claim 18, further comprising a coupling capacitor to change the control signal according to a ratio between a capacitance of the coupling capacitor and a capacitance of the liquid crystal capacitor,
wherein the phototransistor, the liquid crystal capacitor, and the coupling capacitor are all connected to a first node.

20. The touch sensor of claim 19, further comprising:
a first signal line connected to a first electrode of the coupling capacitor and an input terminal of the phototransistor, the first signal line to receive a reset signal;
a second signal line to apply a readout signal to the sensing signal output part;
a third signal line connected to a control terminal of the phototransistor to apply a switching signal to the phototransistor, and
wherein an output terminal of the phototransistor and a second electrode of the coupling capacitor are connected to the first node.

21. The touch sensor of claim 20, wherein the second signal line and the third signal line comprise an $(n-1)^{th}$ gate line and an $n^{th}$ gate line of gate lines arranged in the liquid crystal display panel, respectively, where n is a natural number equal to or greater than 2, the switching signal corresponds to an $n^{th}$ gate signal applied to the $n^{th}$ gate line in an $i^{th}$ frame (i is a natural number equal to or greater than 1), and the readout signal corresponds to an $(n-1)^{th}$ gate signal applied to the $(n-1)^{th}$ gate line in an $(i+1)^{th}$ frame.

22. The touch sensor of claim 20, wherein the sensing signal output part comprises:
a first transistor connected to the first node to output the sensing signal in response to the control signal; and
a second transistor connected to the first transistor to switch the sensing signal output from the first transistor in response to the readout signal.

23. The touch sensor of claim 22, wherein the first transistor comprises:
a control terminal connected to the first node;
an input terminal connected to a driving voltage line to which a driving voltage is applied; and
an output terminal connected to the second transistor, and wherein the second transistor comprises:
an input terminal connected to the output terminal of the first transistor;
a control terminal connected to the second signal line; and
an output terminal connected to the readout line.

24. A liquid crystal display, comprising:
a liquid crystal display panel comprising a plurality of gate lines, a plurality of data lines, a plurality of thin film transistors, each thin film transistor being connected to a corresponding gate line and a corresponding data line, and a plurality of first liquid crystal capacitors respectively connected to the thin film transistors to display an image; and
a touch sensor to sense a variation in external light and a variation in cell gap to sense a touch event, the touch sensor being installed in the liquid crystal display panel, wherein the touch sensor comprises:
a light sensing part to generate a control signal corresponding to of the variation in external light when the liquid crystal display panel is touched;
a capacitance sensing part comprising a liquid crystal capacitor to change the control signal according to a variation in capacitance when the liquid crystal display panel is touched; and
a sensing signal output part to generate a sensing signal in response to the control signal and decide an output timing of the sensing signal~
wherein the capacitance varies according to a change in cell gap of the liquid crystal capacitor.

25. The liquid crystal display of claim 24, wherein the light sensing part comprises a photodiode connected to the liquid crystal capacitor.

26. The liquid crystal display of claim 25, further comprising a coupling capacitor to change the control signal according to a ratio between a capacitance of the coupling capacitor and a capacitance of the liquid crystal capacitor,
wherein the photodiode, the liquid crystal capacitor, and the coupling capacitor are all connected to a first node.

27. The liquid crystal display of claim 26, further comprising:
a first signal line connected to a first electrode of the coupling capacitor and an anode of the photodiode, the first signal line to receive a reset signal; and
a second signal line to apply a readout signal to the sensing signal output part,
wherein a cathode of the photodiode and a second electrode of the coupling capacitor are connected to the first node.

28. The liquid crystal display of claim 27, wherein the first signal line and the second signal line comprise an $n^{th}$ gate line and an $(n-1)^{th}$ gate line of gate lines arranged in the liquid crystal display panel, respectively, where n is a natural number equal to or greater than 2, the reset signal corresponds an $n^{th}$ gate signal applied to the $n^{th}$ gate line in an $i^{th}$ frame (i is a natural number equal to or greater than 1), and the readout signal corresponds to an $(n-1)^{th}$ gate signal applied to the $(n-1)^{th}$ gate line in an $(i+1)^{th}$ frame.

29. The liquid crystal display of claim 24, wherein the light sensing part comprises a phototransistor, and the capacitance sensing part comprises a liquid crystal capacitor connected to the photodiode.

30. The liquid crystal display of claim 29, wherein the thin film transistor and the phototransistor comprise n-type amorphous silicon.

31. The liquid crystal display of claim 29, further comprising a coupling capacitor to change the control signal according to a ratio between a capacitance of the coupling capacitor and a capacitance of the liquid crystal capacitor,
wherein the phototransistor, the liquid crystal capacitor, and the coupling capacitor are all connected to a first node.

32. The liquid crystal display of claim 31, further comprising:
a first signal line connected to a first electrode of the coupling capacitor and an input terminal of the phototransistor, the first signal line to receive a reset signal;
a second signal line to apply a readout signal to the sensing signal output part; and
a third signal line connected to a control terminal of the phototransistor to apply a switching signal to the phototransistor, and
wherein an output terminal of the phototransistor and a second electrode of the coupling capacitor are connected to the first node.

33. The liquid crystal display of claim 32, wherein the second signal line and the third signal line comprise an $(n-1)^{th}$ gate line and an $n^{th}$ gate line of gate lines arranged in the liquid crystal display panel, respectively, (n is a natural number equal to or greater than 2), the switching signal corresponds to an $n^{th}$ gate signal applied to the $n^{th}$ gate line in an $i^{th}$ frame (i is a natural number equal to or greater than 1), and the readout signal corresponds to an $(n-1)^{th}$ gate signal applied to the $(n-1)^{th}$ gate line in an $(i+1)^{th}$ frame.

34. The liquid crystal display of claim 32, further comprising:
an external luminance sensing part to sense an external luminance; and
a voltage variable part to vary a voltage level of the reset signal applied to the first signal line according to the external luminance.

35. The liquid crystal display of claim 34, wherein the voltage variable part comprises:
a look-up table to store a voltage value of the reset signal according to the external luminance; and
a voltage converting circuit to change the voltage level of the reset signal to a voltage value corresponding to the sensed external luminance.

36. A method of driving a touch sensor, comprising:
generating a control signal corresponding to a variation in external light using a photodiode installed in a liquid crystal display panel when the liquid crystal display panel is touched;
changing the control signal based on a variation in capacitance using a liquid crystal capacitor installed in the liquid crystal display panel when the liquid crystal display panel is touched;
generating a sensing signal in response to the control signal; and outputting the sensing signal,
wherein the capacitance varies according to a change in cell gap of the liquid crystal capacitor.

37. The method of claim 36, further comprising resetting a first node in response to a reset signal, to which the liquid crystal capacitor and the photodiode are coupled, before generating the control signal.

38. The method of claim 37, wherein the control signal changes according to a ratio between the capacitance of the liquid crystal capacitor and a capacitance of a coupling capacitor connected to the first node.

* * * * *